Patented June 23, 1942

2,287,359

UNITED STATES PATENT OFFICE 2,287,359

MOTOR FUEL PRODUCTS

Thomas H. Rogers and Vanderveer Voorhees, Hammond, Ind., assignors to Standard Oil Company, Whiting, Ind., a corporation of Indiana No Drawing. Application August 20, 1930, Serial No. 476,717

5 Claims. (Cl. 44—9)

The present invention relates to improvements in hydrocarbon motor fuel products of the character of gasoline, and has to do more particularly with motor fuel products derived by the cracking of higher boiling hydrocarbon oils of such types as display a tendency to form gum or resinification products on storage, even after refining treatment with a dilute sulfuric acid such as sulfuric acid of 75% strength or lower. This tendency may be indicated by an accelerated test designated hereinafter as the oxygen absorption test, which is a measure of the potential gum formation or resinification properties of the motor fuel products.

In methods of cracking high boiling hydrocarbon oils to produce lower boiling hydrocarbon oils, the products which have been secured may in general be grouped in two classes; the first, which at the present time forms the bulk of pressure cracked gasoline, having an anti-knock value somewhat greater but not substantially greater than straight-run gasoline; a somewhat lower Baumé gravity than straight-run gasoline; containing a moderate proportion of unsaturated compounds as determined by combined absorption and polymerization by sulfuric acid in accordance with the method of determination hereafter set forth; and being in general of such a character that the constituents thereof which end to form gum on storage and handling are readily removed by treatment with sulfuric acid to produce a product comparable in that respect to straight-run gasoline. Motor fuel products of the second general class, hitherto derived principally from vapor phase processes or very high temperature pressure cracking processes, have anti-knock values substantially higher than straight-run gasoline; have a much lower A. P. I. gravity; contain large amounts of unsaturateds as determined by sulfuric acid absorption and polymerization; and require excessive treatment with sulfuric acid, with very substantial losses, to remove potential gum-forming constituents.

Although it cannot be said that there is a hard and fast line between the two types of products, the former type of product, with 425° F. end point, will in general have an anti-knock value not exceeding an equivalent of 1.2 cubic centimeters of tetra-ethyl lead per gallon of straight-run Mid-Continent gasoline; an olefin content as determined by sulfuric acid absorption and polymerization of not over 40%; an A. P. I. gravity of 56 to 59°; and an oxygen absorption induction period greater than 125 minutes, as determined by the test hereinafter set forth.

The second type of product, which may be designated as the vapor phase type, will in general have an anti-knock value equivalent to at least 1.2 cc. tetra-ethyl lead per gallon straight-run Mid-Continent gasoline, an A. P. I. gravity of about 49 to 55°; an unsaturated content as determined by sulfuric acid absorption and polymerization exceeding 40%, and usually above 45%; and an oxygen absorption induction period of less than 125 minutes.

The latter type of product in general tends to form gum, even on storage in the dark, and under like conditions, tends to lose its anti-knock properties. The same tendencies may exist, to a greater or less extent, in products of the first mentioned type and, the present invention may be employed in connection therewith, although particularly intended for use in connection with products of the so-called vapor-phase cracked type.

Thus, products of certain processes commonly designated as liquid phase or liquid-vapor phase cracked products, although having a lower unsaturated content than vapor phase cracked products, as shown by combined absorption and polymerization by sulfuric acid, have gum-forming properties similar to those of vapor phase cracked products. The present invention may be applied in connection with such products, as well as with such highly cracked products as are derived by drastic or high temperature cracking or destructive distillation of bituminous materials, such as coal, peat, lignite, and the like.

In determining the oxygen absorption induction period, by which an indication of the potential gum-forming properties of the gasoline on storage and handling may be secured, the following procedure may be employed; 100 cubic centimeters of the motor fuel or gasoline to be tested are placed in a one liter flask, the total volumetric capacity of which is 1150 to 1200 cubic centimeters. The gasoline is maintained at about 212° F. by heating in a steam bath while an oxygen atmosphere is maintained in the flask under a substantially constant pressure of about 2½ atmospheres. The flask is vigorously agitated and the volume of oxygen absorbed is measured at frequent intervals. The oxygen absorption is characterized by an initial period in which relatively small amounts are absorbed and subsequent to this period there is a rapid increase in the rate of absorption. This initial period of slow absorption is designated the induction period, and its end is regarded as the point at which oxygen absorption under the conditions stated reaches a rate of 1 cubic centimeter per minute. If the oxygen absorption is plotted against the time in minutes with equal distances on the coordinates for time in minutes and absorption in cubic centimeters, it will be evident that the end of the induction period will be indicated upon the curve by the point where the tangent to the curve has a slope of 45°. The length of the induction period, as determined by this test, provides a fairly accurate indication of the potential gum-forming behavior of the motor fuel product on storage and handling.

The motor fuel products with which the present invention is primarily concerned, are produced from cracked distillate products of the vapor-phase cracked type which, after treatment with dilute sulfuric acid of 50 to 70% strength, have an oxygen absorption induction period of less than 125 minutes. The following procedure has been employed in producing such a product.

A hydrocarbon oil, preferably a distillate product heavier than gasoline, is forced through a continuous coil in a heating zone and brought therein to an outlet temperature of 825 to 975° F. while maintaining thereupon a pressure exceeding 200 lbs. under conditions to produce from 15 to 35% of hydrocarbons in the gasoline boiling point range in the products leaving the coil. The material leaving the coil is preferably reduced in pressure and fractionally condensed to separate the hydrocarbons in the gasoline range of boiling points as a distillate. The vaporization is controlled, or the distillate product may be rerun, to produce a material conforming to the desired specifications, for example, to 425° F. end point. Such a material has a gravity of 48 to 56° Baumé as compared with 58 to 60° Baumé for a straight-run gasoline of similar boiling range from Mid-Continent crude. The product, without treating, is found to have an oxygen absorption induction period of about 35 to 70 minutes. It is suitably treated with dilute sulfuric acid, say 60% acid, to the extent of 6 lbs. of such acid per barrel of distillate. The loss on treating is about ½%, the color of the product is not substantially altered, but is substantially stabilized and the oxygen absorption induction period is increased to 80 to 90 minutes. In determining the unsaturateds in such a product it shows a combined absorption and polymerization loss of 50% to 70% when the test is made with 90% sulfuric acid. This loss is determined by subjecting a given volume of the material to treatment at room temperature with two volumes of 90% sulfuric acid, separating the remaining oil from the acid layer and redistilling the unabsorbed oil to produce a distillate having the same end point as the original material treated. The loss in volume relative to the original material is that which is designated as the combined absorption and polymerization loss.

A treated distillate product, produced as hereinbefore described, or other cracked products having a tendency to form gum or resinification products on storage, is treated by adding thereto a small proportion of an organic inhibiting agent or anti-oxidant having reducing properties and containing a condensed ring in which is substituted a hydroxyl or amino group or both. Such substances are employed in proportions of, in general, less than 0.1% and preferably less than 0.05%, and substantially stabilize the product against the gum formation and resinification, and also against loss in anti-knock. This stabilization is indicated by an increase in the oxygen absorption induction period of the products to which they are added. As examples of such materials, we employ the naphthols, alpha and beta-naphthol; alpha and beta-naphthylamines, the homologues of the naphthols and naphthyl amines and their aromatic hydrogenated or reduced compounds, the amino-naphthols, such as 1,2-amino-naphthol, the nitroso-naphthols, such as alpha-nitroso-alpha-naphthol, beta-anthrol, anthradiol, chysazol, chrysarobin, phenanthrene-hydroquinone, beta anthramine, nitrosonaphthylamine, nitronaphthylamine (5, 2), phenyl-alpha-naphthylamine, and the like. Corresponding compounds derived from other condensed-ring hydrocarbons such as anthracene and phenanthrene, having reducing properties, may be employed when permitted by considerations of cost and absence of color.

The specific activity of the materials varies to a considerable extent, all of them, however, being effective in inhibiting the gum-forming properties of the motor fuel product and preventing its deterioration, for example, by decrease of its anti-knock value, and these properties are indicated by an increase in the induction period of the product. It is preferred to employ those which, when added to a vapor phase type of product as hereinbefore described, in proportions not exceeding 0.05%, will increase the induction period to above 125 minutes. Thus with a product such as that above described, and which, after dilute acid treatment, has an induction period of 55 minutes and a lead equivalent of 1.7 cubic centimeters tetra-ethyl lead per gallon of straight-run Mid-Continent gasoline, the addition of 0.05% of beta naphthol increases the induction period to about 130 minutes. The addition of 0.05% of alpha-naphthylamine increases the induction period of a similar product to about 140. Alpha-naphthol, beta-naphthylamine, and 1,2-amino-naphthol likewise materially increase the oxygen absorption period of the material.

The results secured by the application of the oxygen absorption test, as hereinbefore described, definitely indicates the behavior of the motor fuel product on storage, both in its tendency to form gum and to lose in anti-knock value.

Thus, fuels treated in accordance with the present invention, on storage over periods such as those customary in commercial operations, say six to eight months, have their normal loss of anti-knock value and increase of gums and gum-forming constituents materially reduced or substantially entirely eliminated.

If desired, the anti-knock value of the motor fuel described herein may be increased by the addition of small amounts of tetra-ethyl lead or other suitable material, and it is intended that the accompanying claims shall include products of the type herein set forth, regardless of the addition thereto of tetra-ethyl lead or other materials modifying their fuel characteristics.

This application is in part a continuation in part of our prior application Serial No. 211,554, filed August 8, 1927.

We claim:

1. A motor fuel consisting essentially of a gasoline having a tendency to deteriorate and develop gum on storage which gasoline has been stabilized against such deterioration and gum formation by the addition thereto of a trace of a naphthol, less than .1%, sufficient to substantially retard such detrioration and gum formation.

2. The method of preserving a cracked hydrocarbon distillate which tends to deteriorate and develop gum on storage, which method comprises incorporating in said distillate a trace of a naphthol, less than .1%, sufficient to substantially retard such deterioration and gum formation.

3. The method of preserving a vapor phase cracked naphtha having an antiknock value equivalent to the antiknock value of straight-run Mid-Continent naphtha containing upwards of 1.3 cubic centimeters of tetra-ethyl lead per gallon, and showing a loss of upwards of 40% by absorption and polymerization by 90% sulfuric acid and having an oxygen absorption induction period of less than 125 minutes which method comprises incorporating in said vapor phase cracked naphtha an amount of a naphthol in the general vicinity of 0.05%.

4. A motor fuel consisting essentially of a hydrocarbon distillate which has a tendency toward deterioration and gum formation which distillate has been stabilized against such deterioration and gum formation by the addition thereto of an amount of a naphthol in the general vicinity of .05%.

5. Method of stabilizing a low-boiling light-colored distillate petroleum product of the class of gasoline or kerosene which normally tends to become discolored or to form gummy materials during storage consisting of adding thereto a trace of a naphthol, less than .1 percent, sufficient to substantially retard the aforesaid discoloration or gum formation.

THOMAS H. ROGERS.
VANDERVEER VOORHEES.